(12) United States Patent
Hargenrader et al.

(10) Patent No.: US 7,592,757 B2
(45) Date of Patent: Sep. 22, 2009

(54) SYSTEM AND METHOD FOR DIMMING ONE OR MORE LIGHT SOURCE

(75) Inventors: John T. Hargenrader, Brighton, MI (US); Mark Edward Dixon, Farmington Hills, MI (US)

(73) Assignee: Magna International Inc., Aurora (CA)

( * ) Notice: Subject to any disclaimer, the term of this patent is extended or adjusted under 35 U.S.C. 154(b) by 146 days.

(21) Appl. No.: 11/693,477

(22) Filed: Mar. 29, 2007

(65) Prior Publication Data

US 2008/0238343 A1 Oct. 2, 2008

(51) Int. Cl.
*H05B 37/00* (2006.01)

(52) U.S. Cl. ............... 315/324; 315/185 S; 315/154; 315/247; 315/291

(58) Field of Classification Search ............ 315/185 S, 315/200 A, 312–325, 291–311, 274–289, 315/247, 246, 149–159
See application file for complete search history.

(56) References Cited

U.S. PATENT DOCUMENTS

| | | | |
|---|---|---|---|
| 6,717,371 B2 * | 4/2004 | Klier et al. ............... | 315/274 |
| 2005/0030192 A1 * | 2/2005 | Weaver et al. .......... | 340/815.45 |
| 2006/0244395 A1 * | 11/2006 | Taipale et al. ............ | 315/277 |
| 2007/0278970 A1 * | 12/2007 | Hsueh et al. ............. | 315/278 |

\* cited by examiner

*Primary Examiner*—Tuyet Vo
(74) *Attorney, Agent, or Firm*—Honigman Miller Schwartz & Cohn LLP

(57) ABSTRACT

A system for dimming one or more light sources includes a first light source that emits a light of a first brightness according to an operating condition of the first light source, a second light source that emits a light of a second brightness according to an operating current of the second light source, wherein the light of the first brightness is different than that of the light of the second brightness, and one or more components that references the operating condition of the first light source, wherein, in response to the referenced operating condition of the first light source, the one or more components modifies the operating current of the second light source to substantially match the light of the second brightness to the light of the first brightness. A method for dimming one or more light sources is also disclosed.

24 Claims, 8 Drawing Sheets

SYSTEM AND METHOD FOR DIMMING ONE OR MORE LIGHT SOURCE

The invention relates in general to a system and method for dimming one or more light sources.

Light emitting diodes (LEDs) have a longer life, preferable efficiency (emitted light/emitted heat), and preferable efficacy (lumens/watt) when compared to other readily available light sources, such as, for example, incandescent light sources.

BRIEF DESCRIPTION OF THE DRAWINGS

The disclosure will now be described, by way of example, with reference to the accompanying drawings, in which.

DETAILED DESCRIPTION

The Figures illustrate an exemplary embodiment of a system and method for dimming one or more light sources in accordance with an embodiment of the invention. It is to be generally understood that the nomenclature used herein is simply for convenience and the terms used to describe the invention should be given the broadest meaning by one of ordinary skill in the art.

I. Dimming with Filter

Figure 1A:
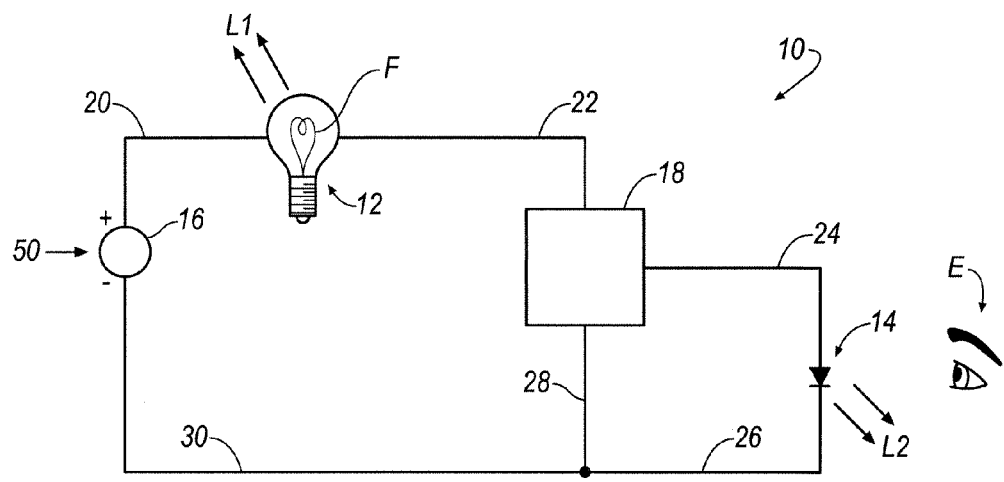
FIG. 1A illustrates a topographical view of a circuit diagram for dimming light emitted by one or more LEDs in accordance with an exemplary embodiment of the invention.

Referring initially to FIG. 1A, a circuit for dimming (i.e., reducing the brightness of) light emitted by one or more incandescent light sources 12 and one or more light emitting diodes (LEDs) 14 is shown generally at 10 according to an embodiment. Light that is emitted from the incandescent light source 12 is shown generally at L1, and light that is emitted from the LED 14 is shown generally at L2.

The circuit 10 also includes a power supply that is shown generally at 16. Also, the circuit 10 includes logic/driver circuitry that is shown generally at 18. The implementation of the logic/driver circuitry 18 may improve the dimming of the light, L1, L2, provided, respectively, by the one or more incandescent light sources 12 and one or more LEDs 14. Nodes are shown generally at 20-30 that connect the above-described components 12-18 to define the circuit 10.

According to an embodiment, the circuit 10 may incorporate a system dimming operation when it is desired to dim the light, L1, L2, from the incandescent light source 12 and LED 14. According to an embodiment, the system dimming operation is conducted such that the incandescent light source 12 and LED 14 are dimmed in concert (i.e., the perceivable emitted brightness and subsequent extinguishing of the light, L1, L2, occurs simultaneously and is substantially the same). In general, the system dimming operation is initiated by influencing the power supply 16 with a pulse width modulation (PWM) control signal 50.

Figure 5:
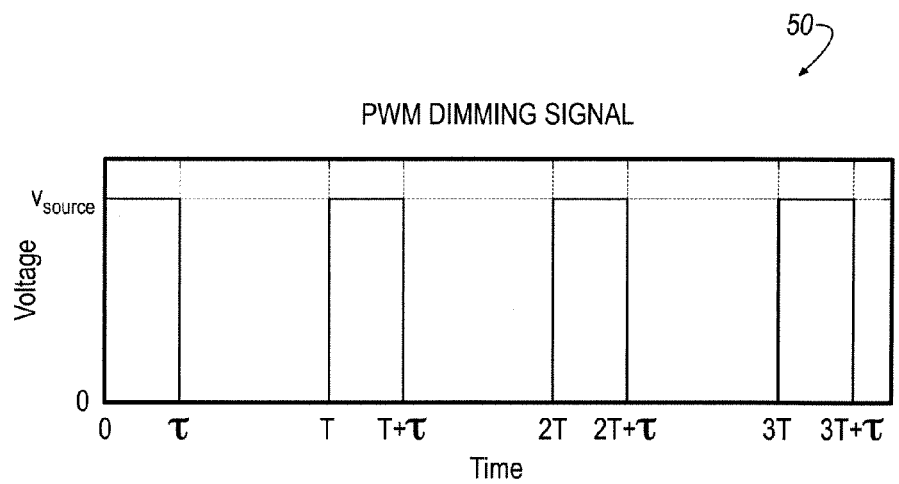
FIG. 5 is an example of a pulse-width modulation (PWM) signal of a power supply defined by a duty cycle.

Referring to FIG. 5, a PWM control signal 50 is shown according to an embodiment. In general, a PWM control signal 50 is defined by a period of time, T, including a non-zero (on signal) duration over a sampling of time, $\tau$, and a zero (off signal) duration over a sampling of time, $T-\tau$. The non-zero duration, $\tau$, divided by the period, T, is the duty cycle, D, of the PWM control signal 50. The duty cycle, D, is expressed below in equation 1) as follows:

$$D = \frac{\tau}{T} \quad\quad 1)$$

In general, when the power supply 16 is influenced by the PWM control signal 50 (i.e., when the duty cycle, D, is less than 100%), a very fast on/off application of voltage is provided to the incandescent light source 12 and the LED 14, which may be defined by, for example, a frequency of the power supply (e.g., approximately 128 Hz). Thus, as the duty cycle, D, is reduced, the duration of voltage on time (i.e., time that current that is passing through the incandescent light source 12 and the LED 14) is reduced. Accordingly, when the on-time voltage is reduced, the time average intensity of emitted light, L1, L2, is reduced. Thus, because of the rapid voltage on/off time, the human eye, E (FIG. 1A), can not resolve the on/off fluctuations of the respectively-emitted light, L1, L2, by the incandescent light source 12 and the LED 14 so as to give the appearance that the light, L1, L2, provided by the incandescent light source 12 and LED 14 is dimming.

Figure 6:
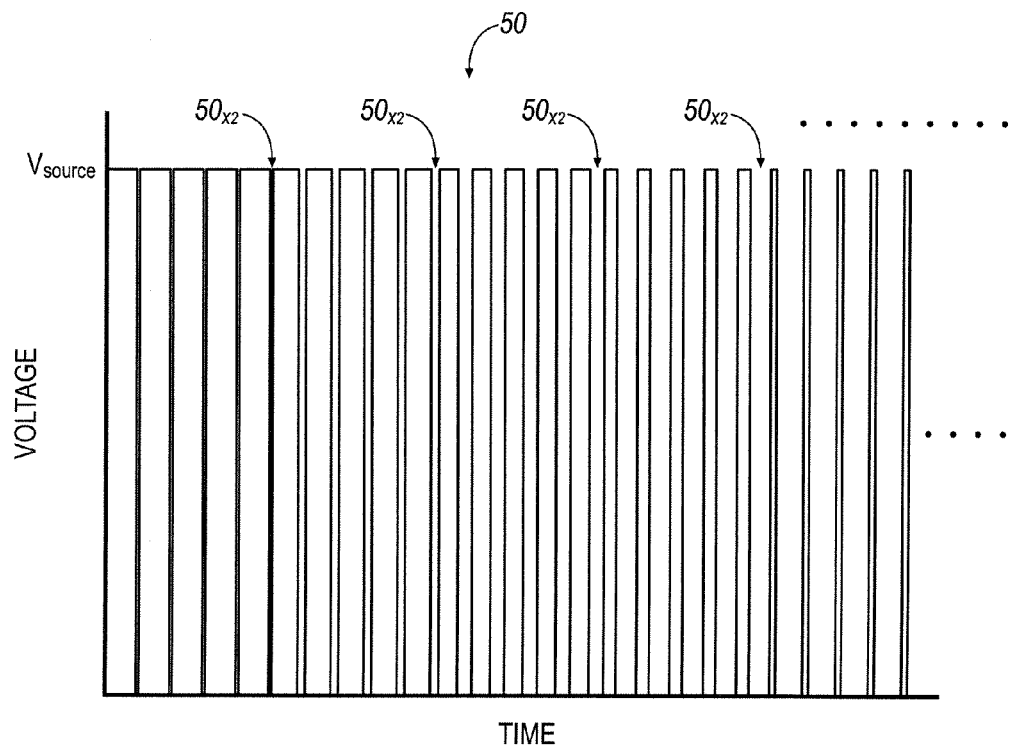
FIG. 6 is an example of a PWM signal for dimming an incandescent light source and an LED in accordance with an exemplary embodiment of the invention.
Figure 7:
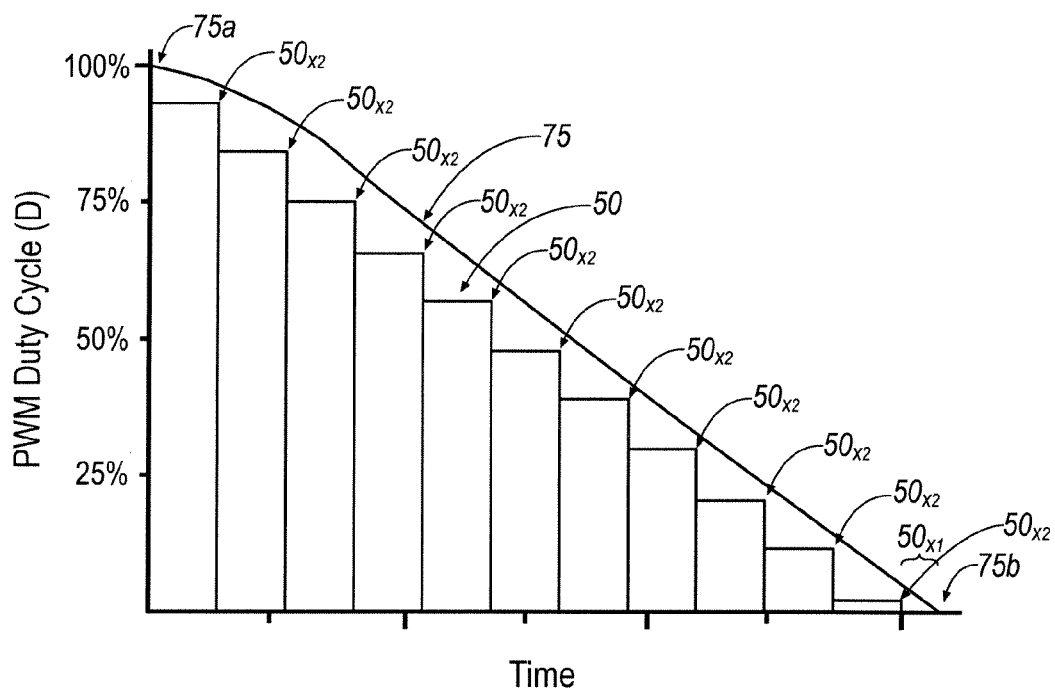
FIG. 7 is a dimming curve of an incandescent light source and LED that is referenced from a PWM duty cycle vs. time chart.

Referring to FIGS. 6 and 7, the relationship between the PWM control signal 50 and a system dimming curve 75 is shown according to an embodiment. In general, the dimming curve 75 is defined by the perceivable emission of light, L1, L2, of both incandescent light source 12 and LED 14 where, at 100% of the duty cycle, D, the incandescent light source 12 and LED 14 provide a maximum brightness level of the emitted light, L1, L2, which is shown generally at 75a (FIG. 7), and, shortly after the duty cycle, D, is reduced to 0%, no light, L1, L2, is emitted by the incandescent light source 12 and LED 14, which is shown generally at 75b (FIG. 7).

According to an embodiment, the system dimming curve 75 is generally modeled by the PWM control signal 50 that is utilized for controlling the illumination/dimming of an incandescent light source. The filament, F (FIG. 1A), of an incandescent light source retains heat and provides light shortly after voltage is removed from the incandescent light source (i.e., the filament of the incandescent light source may include 'a thermal inertia' or 'a volumetric heat capacity'). Thus, at a time $50_{X1}$ (FIG. 7), the dimming curve 75 generally indicates that the incandescent light source 12 (and LED 14) may provide an emission of light even though no current is passing through the incandescent light source 12 according to the duty cycle, D, of the PWM control signal 50 being approximately equal to 0%. Thus, in the absence of the logic/driver circuitry 18, the light, L2, emitted by the LED 14 would otherwise prematurely extinguish before the light, L1, of the incandescent light source 12.

In addition to the difference in dimming of the light, L1, L2, at time $50_{X1}$, an irregularity in the conventional dimming of an LED 14 may also be perceivable to the human eye, E, at times, which are designated generally at $50_{X2}$ in the absence of the logic/driver circuitry 18. Unlike incandescent light sources 12, LEDs 14 are solid state devices that are activated and emit light, L2, only when provided with a positive electric polarity (i.e., LEDs 14 will 'turn on'/emit light, L2, when provided with a positive/non-zero signal, and will 'turn off'/emit no light, L2, when provided with a zero/negative signal). Incandescent light sources 12, conversely, are activated and emit light, L1, regardless of a positive or negative electrical polarity. As such, the LEDs 14 turn on and off at a very fast rate according to the characteristics of the power supply, whereas, incandescent light sources 12 may not appear to turn off (i.e., emit no light, L1) in view of the characteristic of the power supply.

Accordingly, when, for example, the duty cycle, D, is modulated at time a $50_{X2}$ (see, e.g., FIG. 6) the light, L2, emitted by the LED 14 would otherwise appear to dim with an apparent irregularity in the absence of the logic/driver circuitry 18 at the times $50_{X2}$. Thus, as illustrated in FIG. 7, when the duty cycle, D, is modulated, noticeable flicker of the LED 14 would otherwise then be perceivable by the human eye, E, at times $50_{X2}$, whereas the incandescent light source 12 may appear to dim without flickering/an irregularity.

Figure 1B:
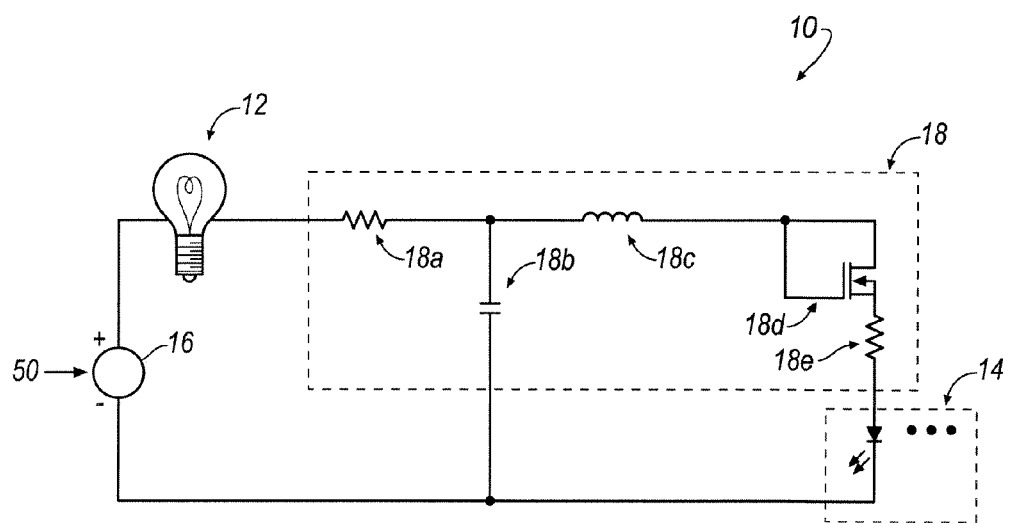
FIG. 1B illustrates a topographical view of a component-level circuit diagram according to the circuit of FIG. 1A.

Referring to FIG. 1B, a component-level diagram of the circuit 10 of FIG. 1A is shown according to an embodiment. According to an embodiment, the logic/driver circuitry 18 provides a system dimming curve 75 that removes the dimming irregularities of the LED 14 at the times $50_{X1}$, $50_{X2}$ as described above.

According to an embodiment, the logic/driver circuitry 18 may be defined to include a low pass filter. The low pass filter may be defined to include, for example, a resistor 18a, a capacitor 18b, and an inductor 18c. In operation, the components defining the filter 18a-18c remove any abrupt current transitions that are introduced by the PWM control signal 50 in order to introduce a current that drives the LED 14 in a manner to provide a brightness/dimming of light, L2, that is matched to the brightness/dimming of light, L1, of the incandescent light source 12.

In addition, the logic/driver circuitry 18 may be defined to include a transistor 18d, such as, for example, a field effect transistor (FET). Also, the logic/driver circuitry may be defined to include a current limiting resistor 18e that dictates the current through the LED 14.

According to an embodiment, it will be appreciated that the circuit 10 is not limited to one incandescent light source 12 and one LED 14. For example, according to an embodiment, the component-level circuit diagram of FIG. 1B may include an array of LEDs 14.

According to an embodiment, the one or more LEDs 14 may have any desirable substrate that provides any desirable color of light, L2. As such, the one or more LEDs 14 may include, but is not limited to, any well known LED substrate that includes, for example, aluminum gallium arsenide (Al-GaAs) that emits light, L2, of a red or infrared color, gallium phosphide (GaP) that emits light, L2, of a red, yellow, or green color, silicon carbide (SiC) that emits light, L2, of a blue color, or the like. Also, the one or more incandescent light sources 12 may be any desirable incandescent light source that is produced for a wide range of voltages ranging from, for example, a few volts to several hundred volts with corresponding brightness levels.

In addition, the power supply 16 is not limited to provide a particular type of signal. For example, the power supply 16 may be defined by and generate any desirable signal, such as, for example, a direct current (DC) low voltage battery signal, a half-wave rectified DC signal, a full-wave rectified DC signal, an alternating current (AC) signal, a PWM signal, or the like.

II. Dimming with Microprocessor

Figure 2A:
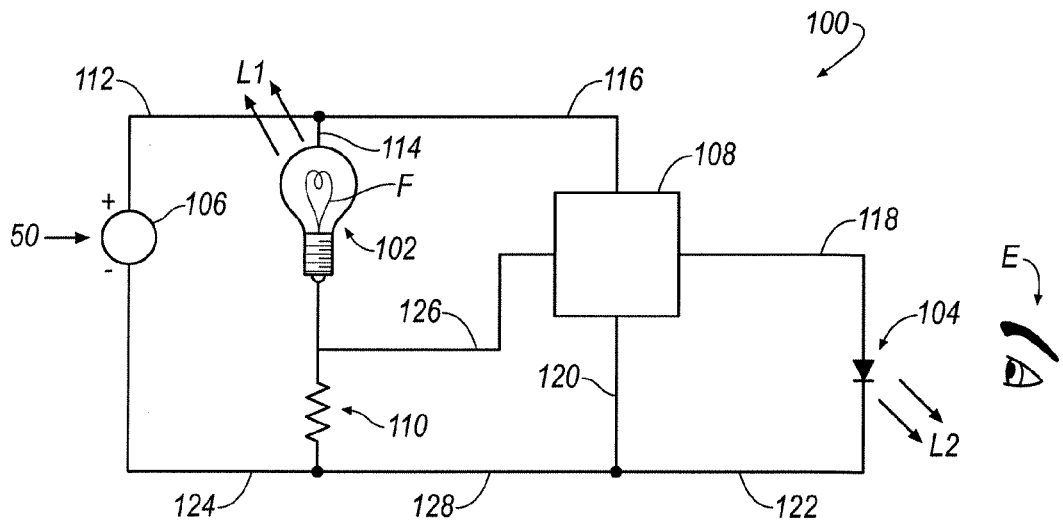
FIG. 2A illustrates a topographical view of a circuit diagram for dimming light emitted by one or more LEDs in accordance with an exemplary embodiment of the invention.

Referring to FIG. 2A, a circuit for dimming light emitted by one or more incandescent light sources 102 and one or more LEDs 104 is shown generally at 100 according to an embodiment. Light that is emitted from the incandescent light source 102 is shown generally at L1, and light that is emitted from the LED 104 is shown generally at L2.

The circuit 100 also includes a power supply that is shown generally at 106. Also, the circuit 100 includes logic/driver circuitry that is shown generally at 108, and a voltage/current sense resistor that is shown generally at 110. The implementation of the logic/driver circuitry 108 may improve the dimming of the light, L1, L2, provided, respectively, by the one or more incandescent light sources 102 and one or more LEDs 104. Nodes are shown generally at 112-128 that connect the above-described components 102-110 to define the circuit 100.

According to an embodiment, the circuit 100 may incorporate a system dimming operation function when it is desired to dim the light, L1, L2, from the incandescent light source 102 and LED 104. According to an embodiment, the system dimming operation is conducted such that the incandescent light source 102 and LED 104 are dimmed in concert (i.e., the perceivable emitted brightness and subsequent extinguishing of the light, L1, L2, occurs simultaneously and is substantially the same). In general, the system dimming operation is initiated by modulating the PWM control signal 50, the operation of which is similarly described above in FIGS. 5-6. In addition, as similarly described above, a system dimming curve 75 is shown generally in FIG. 7.

Figure 2B:
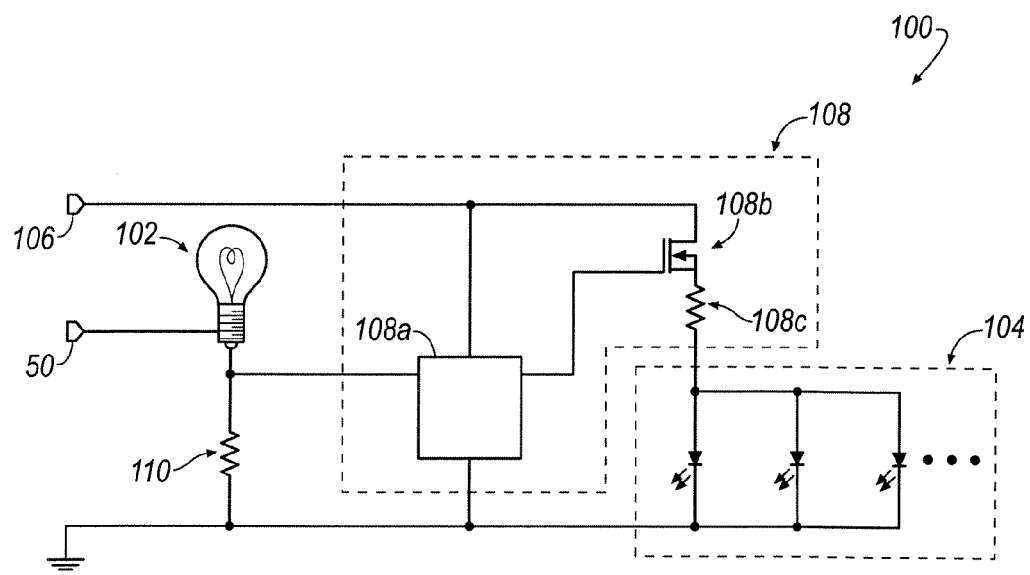
FIG. 2B illustrates a topographical view of a component-level circuit diagram according to the circuit of FIG. 2A.

Referring to FIG. 2B, a component-level diagram of the circuit 100 of FIG. 2A is shown according to an embodiment. According to an embodiment, the logic/driver circuitry 108 provides a system dimming curve 75 that removes dimming irregularities of the LED 104 at times $50_{X1}$, $50_{X2}$ as described above.

The logic/driver circuitry 108 may be defined to include a microprocessor 108a, or, alternatively, an application specific integrated circuit (ASIC). In operation, according to an embodiment, the PWM control signal 50 may influence the current through, and, correspondingly, the dimming of the incandescent light source 102. The voltage/current sense resistor 110, which may be defined by, for example, a 0.1Ω, resistance, may sense the current through the incandescent light source 102 and provide the value of the sensed current through the incandescent light source 102 to the microprocessor 108a or ASIC driver.

Upon learning the value of the sensed current through the incandescent light source 102, the microprocessor 108a may refer to a pre-programmed look-up table, which is shown below at Table 1. According to an embodiment, the value of the sensed current through the incandescent light source 102 may be equated or otherwise referenced to a duty cycle, D, of the PWM control signal 50, which is shown in the left column of Table 1. When the duty cycle, D, of the PWM control signal 50 is determined, an output effective current of the LED 104 is located in the look-up table, and, the maximum current, A, of the power supply 106 is limited according to a corresponding value located value in the look-up table.

TABLE 1

| PWM | Output Effective Current |
|---|---|
| 100 | 1.00 A |
| 90 | 0.98 A |
| 80 | 0.87 A |
| 70 | 0.76 A |
| 60 | 0.65 A |
| 50 | 0.55 A |
| 40 | 0.45 A |
| 30 | 0.35 A |
| 20 | 0.25 A |
| 10 | 0.15 A |
| 0 | 0.05 A |

According to an embodiment as shown above in Table 1, the output effective current values may be provided in a linear relationship. However, it will be appreciated that the output effective current values may not necessarily include a linear relationship and may be defined by, for example, an exponential relationship, a logarithmic relationship, or the like.

In addition, the logic/driver circuitry 108 may be defined to include a transistor 108b, such as, for example, a field effect transistor (FET). In operation, the transistor 108b operates as a switch. Also, the logic/driver circuitry 108 may be defined to include a current limiting resistor 108c that dictates the current through the LED 104.

According to an embodiment, it will be appreciated that the circuit 100 is not limited to one incandescent light source 102 and one LED 104. For example, according to an embodiment, the component-level circuit diagram of FIG. 2B may include an array of LEDs 104. As similarly described above, the one or more LEDs 104 may have any desirable substrate that provides any desirable color of light, L2. Also, the one or more incandescent light sources 102 may be defined by any desirable incandescent light source that is produced for a wide range of voltages ranging from, for example, a few volts to several hundred volts with corresponding brightness levels.

In addition, the power supply 106 is not limited to provide a particular type of signal. For example, the power supply 106 may be defined by and generate any desirable signal, such as, for example, a direct current (DC) low voltage battery signal, a half-wave rectified DC signal, a full-wave rectified DC signal, an alternating current (AC) signal, a PWM signal, or the like.

III. Dimming with Optical Current Regulation

Figure 3A:
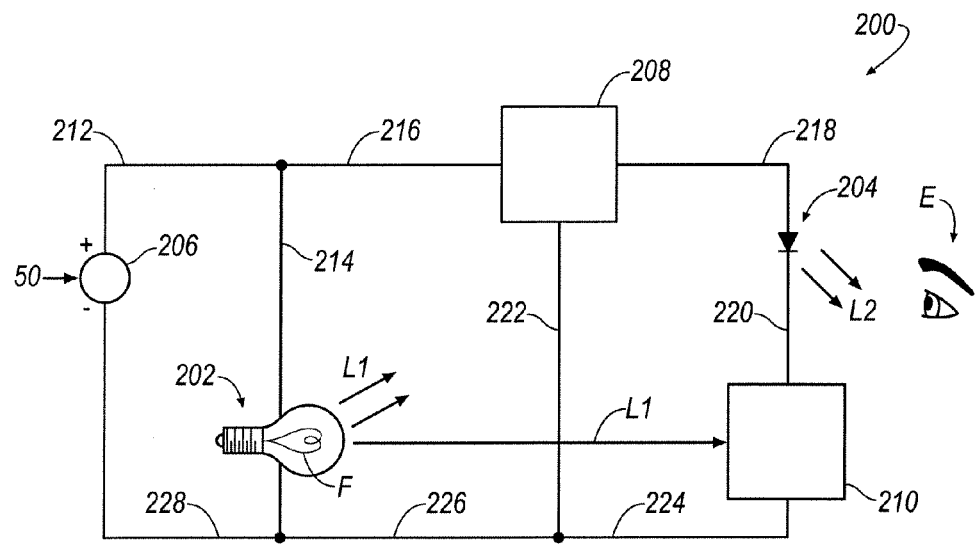
FIG. 3A illustrates a topographical view of a circuit diagram for dimming light emitted by one or more LEDs in accordance with an exemplary embodiment of the invention.

Referring to FIG. 3A, a circuit for dimming light emitted by one or more incandescent light sources 202 and one or more LEDs 204 is shown generally at 200 according to an embodiment. Light that is emitted from the incandescent light source 202 is shown generally at L1, and light that is emitted from the LED 204 is shown generally at L2.

The circuit 200 also includes a power supply that is shown generally at 206. Also, the circuit 200 includes logic/driver circuitry that is shown generally at 208, and an optical sensor is shown generally at 210. The implementation of the logic/driver circuitry 208 and the optical sensor 210 may improve the dimming of the light, L1, L2, provided, respectively, by the one or more incandescent light sources 202 and one or more LEDs 204. Nodes are shown generally at 212-228 that connect the above-described components 202-210 to define the circuit 200.

According to an embodiment, the circuit 200 may incorporate a system dimming operation function when it is desired to dim the light, L1, L2, from the incandescent light source 202 and LED 204. According to an embodiment, the system dimming operation is conducted such that the incandescent light source 202 and LED 204 are dimmed in concert (i.e., the perceivable emitted brightness and subsequent extinguishing of the light, L1, L2, occurs simultaneously and is substantially the same). In general, the system dimming operation is initiated by influencing the power supply 206 with a PWM control signal 50, which is similarly described above in FIGS. 5 and 6. In addition, as similarly described above, a system dimming curve 75 is shown generally in FIG. 7.

Figure 3B:
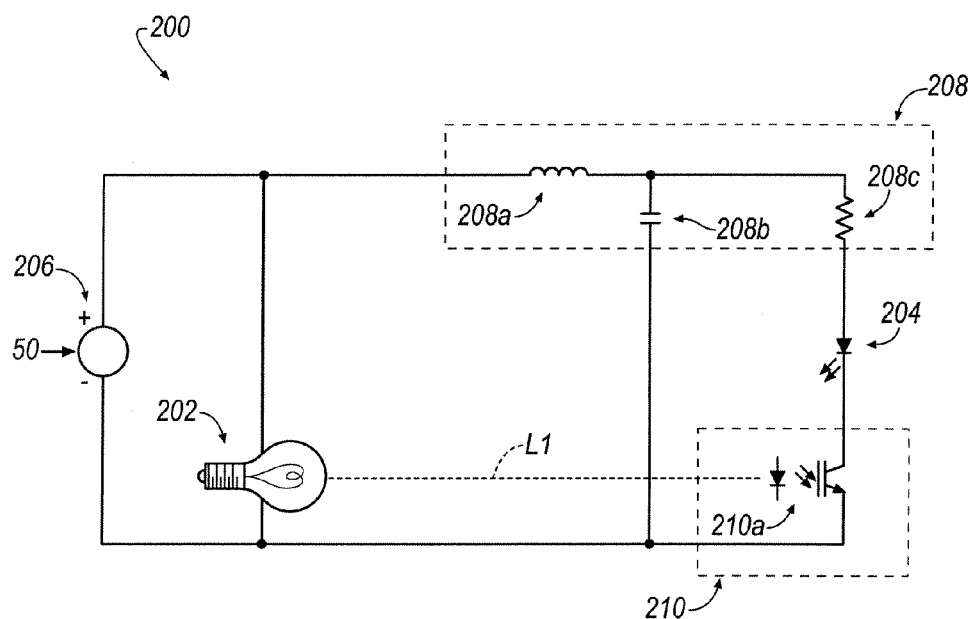
FIG. 3B illustrates a topographical view of a component-level circuit diagram according to the circuit of FIG. 3A.

Referring to FIG. 3B, a component-level diagram of the circuit 200 of FIG. 3A is shown according to an embodiment. According to an embodiment, the logic/driver circuitry 208 and optical sensor 210 provide a system dimming curve 75 that removes dimming irregularities of the LED 204 at the times $50_{x1}$, $50_{x2}$ as described above.

The logic/driver circuitry 208 may be defined to include a low pass filter. The low pass filter may be defined to include, for example, an inductor 208a and a capacitor 208b. In addition, the logic/driver circuitry 208 may also include a current limiting resistor 208c. In operation, the components defining the filter 208a, 208b remove any abrupt current transitions that are introduced by the PWM control signal 50 in order to introduce a current that drives the LED 204 in a manner to provide a brightness/dimming of light, L2, that is matched to the light, L1, of the incandescent light source 202.

In addition, the optical sensor 210 may also assist in the matching of the emitted light, L1, of the LED 204 with the light, L1, emitted by the incandescent light source 202. According to an embodiment, the optical sensor 210 includes a transistor 210a and is optically connected with (i.e., electrically de-coupled from) the incandescent light source 202. Operationally, the optical sensor senses the luminance/brightness of the light, L1, from the incandescent light source 202 to control the output of the transistor 210a to thereby allow more or less current to the LED 204 for increasing or decreasing the brightness of the light, L2, from the LED 204.

According to an embodiment, it will be appreciated that the circuit 200 is not limited to one incandescent light source 202 and one LED 204. For example, according to an embodiment, the component-level circuit diagram of FIG. 3B may include an array of LEDs 204.

According to an embodiment, the one or more LEDs 204 may have any desirable substrate that provides any desirable color of light, L2. As such, the one or more LEDs 204 may include, but is not limited to, any well known LED substrate that includes, for example, aluminum gallium arsenide (AlGaAs) that emits light, L2, of a red or infrared color, gallium phosphide (GaP) that emits light, L2, of a red, yellow, or green color, silicon carbide (SiC) that emits light, L2, of a blue color, or the like. Also, the one or more incandescent light sources 202 may be any desirable incandescent light source that is produced for a wide range of voltages ranging from, for example, a few volts to several hundred volts with corresponding brightness levels.

In addition, the power supply 206 is not limited to provide a particular type of signal. For example, the power supply 206 may be defined by and generate any desirable signal, such as, for example, a direct current (DC) low voltage battery signal, a half-wave rectified DC signal, a full-wave rectified DC signal, an alternating current (AC) signal, a PWM signal, or the like.

IV. Dimming with a Microprocessor and Optical Sensing

Figure 4A:
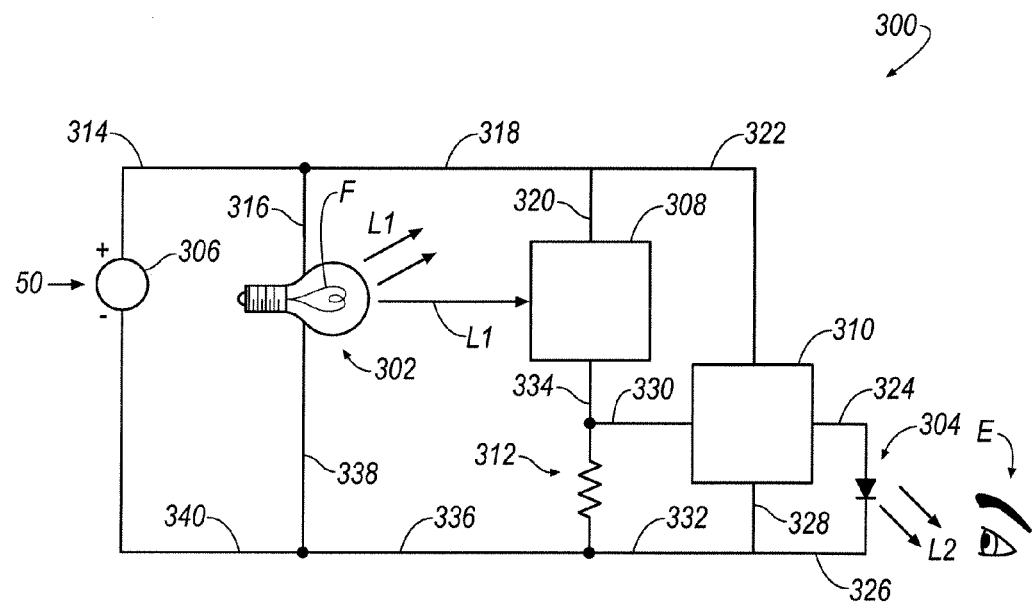
FIG. 4A illustrates a topographical view of a circuit diagram for dimming light emitted by one or more LEDs in accordance with an exemplary embodiment of the invention.

Referring to FIG. 4A, a circuit for dimming light emitted by one or more incandescent light sources 302 and one or more LEDs 304 is shown generally at 300 according to an embodiment. Light that is emitted from the incandescent light source 302 is shown generally at L1, and light that is emitted from the LED 304 is shown generally at L2.

The circuit 300 also includes a power supply that is shown generally at 306. Also, the circuit includes an optical sensor 308, logic/driver circuitry that is shown generally at 310, and a voltage/current sense resistor that is shown generally at 312. The implementation of the optical sensor 308, the logic/driver circuitry 310, and the voltage/current sense resistor 312 may improve the dimming of the light, L1, L2, provided, respectively, by the one or more incandescent light sources 302 and one or more LEDs 304. Nodes are shown generally at 314-340 that connect the above-described components 302-312 to define the circuit 300.

According to an embodiment, the circuit 300 may incorporate a system dimming operation function when it is desired to dim the light, L1, L2, from the incandescent light source 302 and LED 304. According to an embodiment, the system dimming operation is conducted such that the incandescent light source 302 and LED 304 are dimmed in concert (i.e., the perceivable emitted brightness and subsequent extinguishing of the light, L1, L2, occurs simultaneously and is substantially the same). In general, the system dimming operation is initiated by modulating the PWM control signal 50, which is similarly described above in FIGS. 5 and 6. In addition, as similarly described above, a system dimming curve 75 is shown generally in FIG. 7.

Figure 4B:
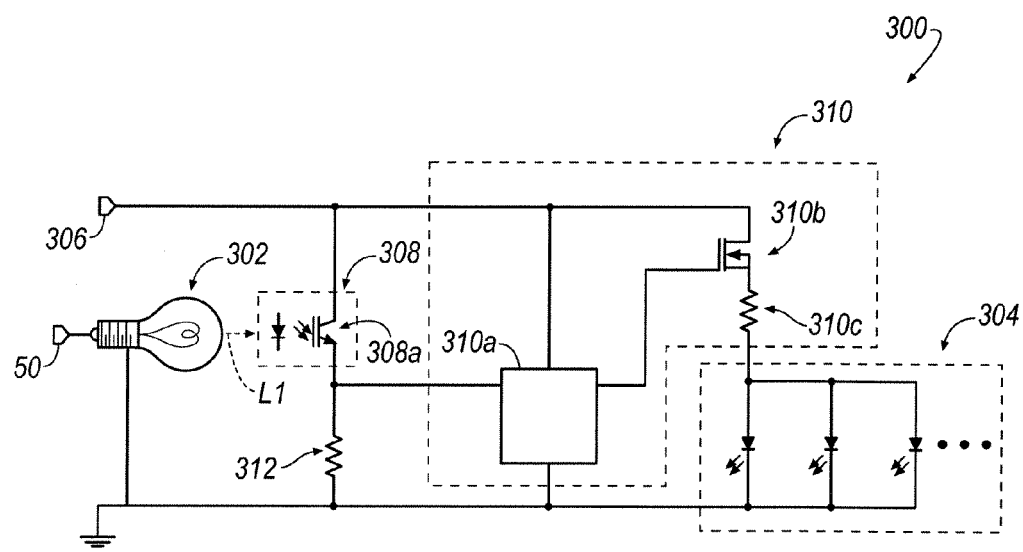
FIG. 4B illustrates a topographical view of a component-level circuit diagram according to the circuit of FIG. 4A.

Referring to FIG. 4B, a component-level diagram of the circuit 300 of FIG. 4A is shown according to an embodiment. According to an embodiment, the optical sensor 308, logic/driver circuitry 310, and voltage/current sense resistor 312 provide a system dimming curve 75 that removes dimming irregularities of the LED 304 at the times $50_{X1}$, $50_{X2}$.

In general, the circuit 300 includes a combination of similar operational features shown and described above in FIGS. 2B and 3B. The optical sensor 308 includes a transistor 308a and is optically connected with (i.e., electrically de-coupled from) the incandescent light source 302. Operationally, the optical sensor 308 is a passive element that senses the luminance/brightness of the light, L1, from the incandescent light source 302 to control the output of the transistor 308a.

The output of the output of the optical sensor's transistor 308a may be, for example, a luminance value ranging between 0%-100%. The luminance value is then provided as an input to the microprocessor 310a. Output of the microprocessor 310a is provided to a transistor 310b and then to a current limiting resistor 310c.

Upon learning the luminance value from the optical sensor's transistor 308a, the microprocessor 310a may refer to a pre-programmed look-up table, which is shown below at Table 2. According to an embodiment, the luminance value (see, e.g., the left column in the look-up table in Table 2) may be equated or otherwise referenced to an output effective current for driving the logic/controller transistor 310b (see, e.g., the right column in the look-up table in Table 2). As a result, the output effective current for driving the transistor 310b regulates a current from the power supply 306 that is provided to increase or decrease the brightness of the LED 304 according to the brightness/luminance of the incandescent light source 302.

TABLE 2

| Illuminance (%) | Output Effective Current (PWM to Transistor) |
|---|---|
| 100 | 1.00 A |
| 90 | 0.98 A |
| 80 | 0.87 A |
| 70 | 0.76 A |
| 60 | 0.65 A |
| 50 | 0.55 A |
| 40 | 0.45 A |
| 30 | 0.35 A |
| 20 | 0.25 A |
| 10 | 0.15 A |
| 0 | 0.05 A |

According to an embodiment as shown above in Table 2, the output effective current valves may be provided in a linear relationship. However, it will be appreciated that the output effective current values may not necessarily include a linear relationship and may be defined by, for example, an exponential relationship, a logarithmic relationship, or the like.

According to an embodiment, it will be appreciated that the circuit 300 is not limited to one incandescent light source 302 and one LED 304. For example, according to an embodiment, the component-level circuit diagram of FIG. 4B may include an array of LEDs 304.

According to an embodiment, the one or more LEDs 304 may have any desirable substrate that provides any desirable color of light, L2. As such, the one or more LEDs 304 may include, but is not limited to, any well known LED substrate that includes, for example, aluminum gallium arsenide (AlGaAs) that emits light, L2, of a red or infrared color, gallium phosphide (GaP) that emits light, L2, of a red, yellow, or green color, silicon carbide (SiC) that emits light, L2, of a blue color, or the like. Also, the one or more incandescent light sources 302 may be any desirable incandescent light source that is produced for a wide range of voltages ranging from, for example, a few volts to several hundred volts with corresponding brightness levels.

In addition, the power supply 306 is not limited to provide a particular type of signal. For example, the power supply 306 may be defined by and generate any desirable signal, such as, for example, a direct current (DC) low voltage battery signal, a half-wave rectified DC signal, a full-wave rectified DC signal, an alternating current (AC) signal, a PWM signal, or the like.

Figure 8:
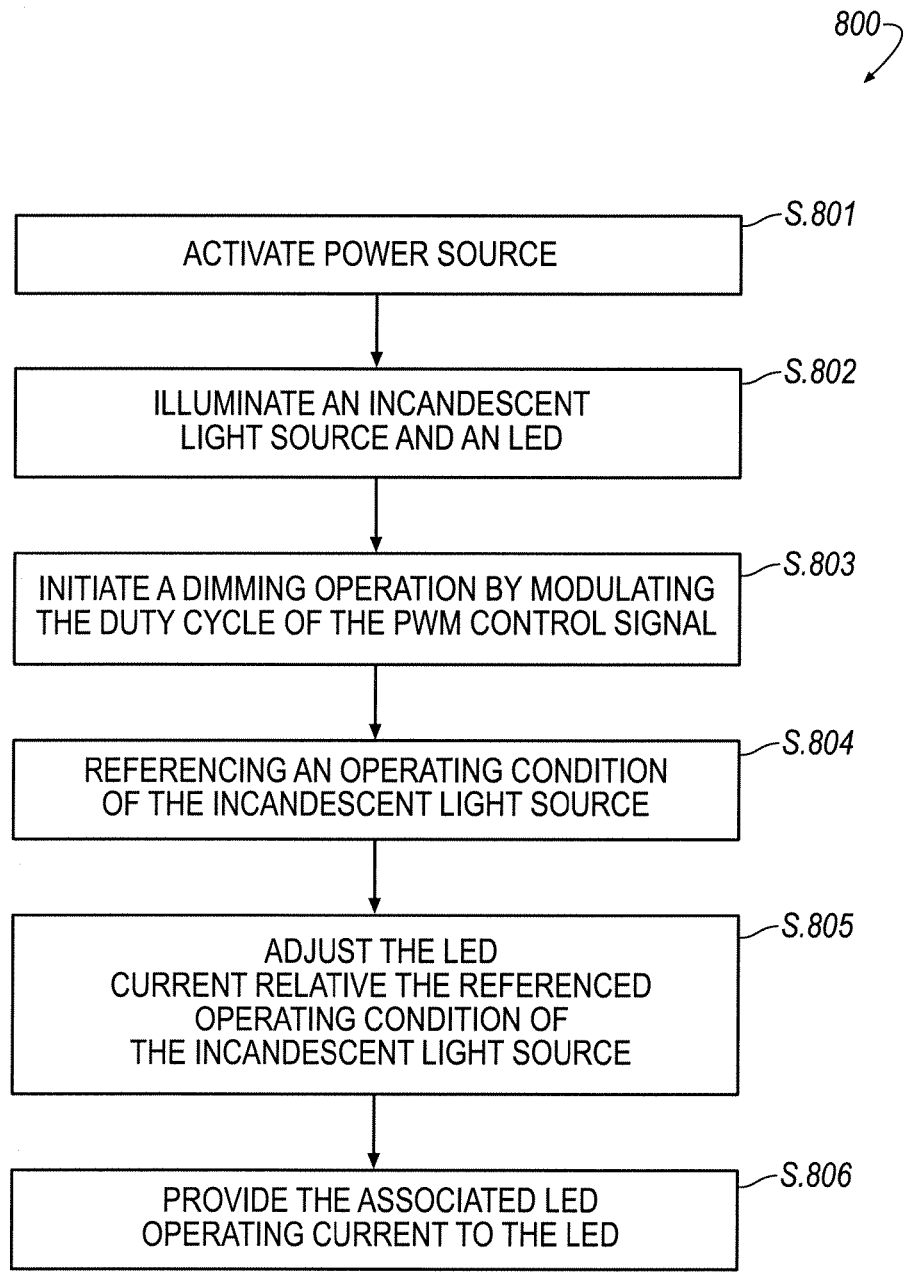
FIG. 8 is a flow chart illustrating a method for dimming one or more light sources in accordance with an exemplary embodiment of the invention.

Referring to FIG. 8, a method for operating the circuits 10, 100, 200, 300 is shown generally at 800 according to an embodiment. At step, S.801, prior to a system dimming operation at step S.803, the incandescent light source 12, 102, 202, 302 and the LED 14, 104, 204, 304 may be enabled to emit light, L1, L2, respectively, at step, S.802. Then, at step, S.803, the duty cycle, D, of a PWM control signal 50 is modulated to initiate a system dimming operation. During the system dimming operation, as explained above, the human eye, E, perceives a reduced brightness of the light, L1, L2 emitted by the light sources 12, 14 as defined by the PWM control signal 50.

At step, S.804, the logic/driver 18, 108, 208, 310 references an operating condition of the incandescent light source 12, 102, 202, 302. According to an embodiment, step, S.804, may include: a direct referencing of the operating current of the incandescent light source 12, 102, 202, 302 (FIGS. 1B and 2B), a direct sensing of the luminescent output of the incandescent light source 12, 102, 202, 302 (FIG. 3B), or a direct sensing of the operating current and/or luminescent output of the incandescent light source 12, 102, 202, 302 (FIG. 4B).

At step, S.805, in response to the referencing of the operating condition of the incandescent light source 12, 102, 202, 302, the logic/driver circuitry 18, 108, 208, 310 and/or optical sensor 210, 308 adjusts the operating current of the LED 14, 104, 204, 304. According to an embodiment, step, S.805, may include: a filtering of the operating current of the incandescent light source 12, 102, 202, 302 (FIG. 1B). According to an embodiment, step, S.805, may include associating the operating current of the incandescent light source 12, 102, 202, 302 with an operating current value of the LED 14, 104, 204, 304 in a look-up table and selecting an operating current of the LED 14, 104, 204, 304 from the look-up table in view of the operating current of the incandescent light source 12, 102, 202, 302 (FIG. 2B). According to an embodiment, step, S.805 may include regulating an operating current of the LED 14, 104, 204, 304 through a transistor 210*a* of an optical sensor (FIG. 3B). According to an embodiment, step, S.805 may include associating the luminescent output of the incandescent light source 12, 102, 202, 302 with an operating current value of the LED 14, 104, 204, 304 in a look-up table and selecting an operating current of the LED 14, 104, 204, 304 from the look-up table in view of the luminescent output of the incandescent light source 12, 102, 202, 302 (FIG. 4B).

Once the operating current of the LED 14, 104, 204, 304 is adjusted at step, S.805, the LED 14, 104, 204, 304 will emit light, L2, that is dimmed and extinguishes in concert at similar rate as that of the light, L1, emitted by the incandescent light source 12, 102, 202, 302 so that the light, L2, does not flicker or prematurely extinguish in comparison to the dimming and extinguishing of the light, L1, provided by the incandescent light source 12, 102, 202, 302.

Although incandescent light sources 12, 102, 202, 302 have a relatively poor life, efficiency, and efficacy, incandescent light sources 12, 102, 202, 302 are gradually being replaced with or supplemented by LEDs 14, 104, 204, 304 in a circuit due to the fact that LEDs are becoming more affordable. Thus, the inventive circuits 10, 100, 200, 300 provide a solution to the differences and drawbacks associated with the dimming behavior/simultaneous extinguishing of the emitted light, L1, L2 of incandescent light sources and LEDs in a same circuit.

Accordingly, the circuit 10, 100, 200, 300 may often be implemented in a variety of home, outdoor, automotive, aircraft, aerospace, and military applications. According to an embodiment, in an automotive application, the incandescent light source 12, 102, 202, 302 may be utilized to emit light, L1, from a headliner or overhead storage bin (not shown), and the LEDs 14, 104, 204, 304 may be utilized to emit light, L2, from an instrument panel/radio display, headlight/headlamp, beverage holder, interior trim panel (not shown), or the like.

Figure 9:
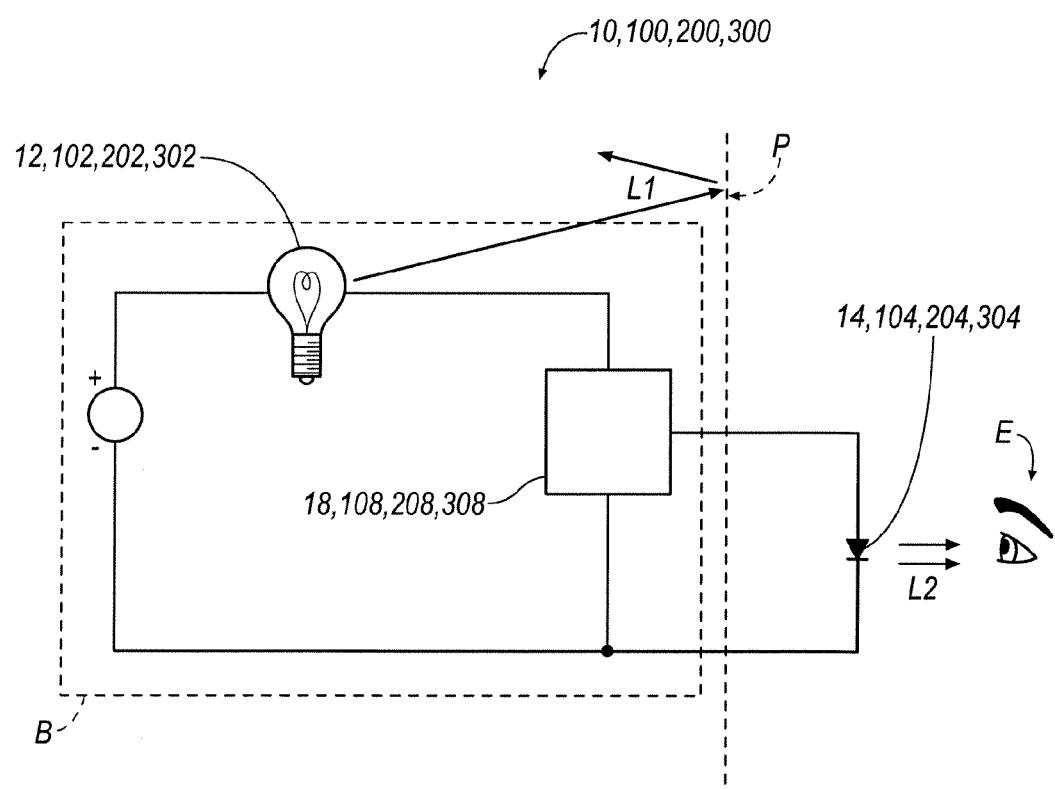
FIG. 9 illustrates a topographical view of a circuit diagram for diming light emitted by one or more LEDs in accordance with an exemplary embodiment of the invention.

In an alternative embodiment, as seen in FIG. 9, it will be appreciated that the incandescent light source 12, 102, 202, 302 may be utilized as a reference component (and not as a viewable illumination component) that regulates the behavior of the LEDs 14, 104, 204, 304 as described above. As shown in FIG. 9, light, L1, from the incandescent light source 12, 102, 202, 302 may not necessarily be viewable by an occupant, and, as such, no comparison of the emitted L1, L2 is permitted to be seen by the human eye, E. In this embodiment, for example, the incandescent light source 12, 102, 202, 302 may be positioned on or proximate a circuit board, B, carrying components of the circuit 10, 100, 200, 300. Accordingly, for example, the circuit board, B, may be positioned behind, for example, vehicle structure, such as, for example, an instrument panel, P, that prevents the occupant to view the light, L1, whereas the light, L2, from the LED 14, 104, 204, 304 is provided proximate or within the passenger compartment area to permit the occupant to view the light, L2, from the LED 14, 104, 204, 304. Alternatively, the incandescent light source 12, 102, 202, 302 may be located within the passenger compartment area, but, may include, for example, an opaque surface that blocks emission of the light, L1. Thus, the LEDs 14, 104, 204, 304 may be dimmed and behave similarly to that of an incandescent light source 12, 102, 202, 302 such that the viewer/occupant does not, or, is restricted from/unable to see the emitted light, L1, from the incandescent light source 12, 102, 202, 302.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A system for dimming one or more light sources, comprising:
    a first light source that emits a light of a first brightness according to an operating condition of the first light source;
    a second light source that emits a light of a second brightness according to an operating current of the second light source; and
    one or more components that reference the operating condition of the first light source, wherein, in response to the referenced operating condition of the first light source, the one or more components modifies the operating current of the second light source to substantially match the light of the second brightness to the light of the first brightness, wherein the first light source is an incandescent light source and the second light source is a light emitting diode (LED), and wherein the one or more components includes a low pass filter that removes abrupt transitions in the operating current of the second light source.

2. The system for dimming one or more light sources according to claim 1 further comprising a power supply defined by pulse width modulation (PWM) control signal, wherein the modulation of a duty cycle of the PWM control signal controls the light of the first brightness of the first light source.

3. The system for dimming one or more light sources according to claim 1, wherein the one or more components further includes:
    a current sense resistor, and
    a microprocessor including a look-up table, wherein the look-up table includes a plurality of LED operating current values associated with a plurality of sensed current values of the incandescent light source, wherein the current sense resistor provides a sensed operating current of the incandescent light source to the microprocessor, wherein, in response to the provided operating current of the incandescent light source, the microprocessor selects one of plurality of LED operating current values from the look-up table in view of the provided operating current of the incandescent light source.

4. The system for dimming one or more light sources according to claim 1, wherein the one or more components includes:

an optical sensor that senses the luminance of the incandescent light source; and a microprocessor including a look-up table, wherein the look-up table includes a plurality of LED operating current values associated with a plurality of sensed luminescent values of the incandescent light source, wherein the optical sensor provides a sensed luminescent value of the incandescent light source to the microprocessor, wherein, in response to the provided luminescent value of the incandescent light source, the microprocessor selects one of plurality of LED operating current values from the look-up table in view of the provided luminescent value of the incandescent light source.

5. The system for dimming one or more light sources according to claim 1, wherein the light of the first brightness from the incandescent light source is not viewable by a vehicle occupant, and wherein light of the second brightness from the LED is viewable by the vehicle occupant.

6. The system for dimming one or more light sources according to claim 1, wherein the one or more components includes:

an optical sensor that senses the luminance of the incandescent light source.

7. The system for dimming one or more light sources according to claim 6, wherein the optical sensor includes:

a transistor that regulates operating current of the LED in view of the sensed luminance of the incandescent light source.

8. A method for dimming one or more light sources, comprising the steps of:

providing light of a first brightness from a first light source according to an operating condition of the first light source;

providing light of a second brightness from a second light source according to an operating current of the second light source;

referencing the operating condition of the first light source;

matching the light of the second brightness to the light of the first brightness; and passing the operating current of the second light source through a low pass filter to removes abrupt transitions in the operating current of the second light source.

9. The method according to claim 8, wherein prior to providing the light of the first brightness step, the method includes the step of modulating a power supply defined by a duty cycle of a pulse width modulation (PWM) control signal.

10. The method according to claim 9, wherein the first light source is an incandescent light source and the second light source is a light emitting diode (LED).

11. The method according to claim 10, wherein the operating condition of the incandescent light source is a luminescent output of the incandescent light source.

12. The method according to claim 10 further comprising the step of preventing the viewability of the light of the first brightness from the incandescent light source is not viewable by a vehicle occupant, and permitting the viewability of the light of the second brightness from the LED.

13. The method according to claim 10, wherein the operating condition of the incandescent light source is an operating voltage of the incandescent light source.

14. The method according to claim 13, wherein the referencing step further comprises the steps of associating, in a microprocessor, the operating voltage of the incandescent light source with one of a plurality of operating currents of the LED in a look-up table; and selecting one of the plurality of operating currents of the LED in the look-up table that is associated with the operating voltage of the incandescent light source.

15. The method according to claim 13, wherein the referencing step further comprises the steps of associating, in a microprocessor, the luminescent output of the incandescent light source with one of a plurality of operating currents of the LED in a look-up table; and selecting one of the plurality of operating currents of the LED in the look-up table that is associated with the luminescent output of the incandescent light source.

16. A system for dimming one or more light sources, comprising:

a first light source that emits a light of a first brightness according to an operating condition of the first light source;

a second light source that emits a light of a second brightness according to an operating current of the second light source, wherein the light of the first brightness is different than that of the light of the second brightness; and a means for modifying the operating current of the second light source to substantially math the light of the second brightness to the light of the first brightness, wherein the modifying means includes an optical sensor that senses the luminance of the second light source.

17. The system for dimming one or more light sources according to claim 16, wherein the optical sensor includes:

a transistor that regulates the operating current of the LED in view of the sensed luminance of the incandescent light source.

18. The system for dimming one or more light sources according to claim 16, wherein the means for modifying includes one or more components that references the operating condition of the first light source, wherein, in response to the referenced operating condition of the first light source, the one or more components modifies the operating current of the second light source to substantially match the light of the second brightness to the light of the first brightness.

19. The system for dimming one or more light sources according to claim 18 further comprising a power supply defined by pulse width modulation (PWM) control signal, wherein the modulation of a duty cycle of the PWM control signal controls the light of the first brightness of the first light source.

20. The system for dimming one or more light sources according to claim 19, wherein the first light source is an incandescent light source and the second light source is a light emitting diode (LED).

21. The system for dimming one or more light sources according to claim 20, wherein the one or more components includes:

a low pass filter defined by a resistor, capacitor, and inductor, wherein the low pass filter removes abrupt transitions in the LED operating current.

22. The system for dimming one or more light sources according to claim 20, wherein the one or more components includes:

an current sense resistor; and a microprocessor including a look-up table, wherein the look-up table includes a plurality of LED operating current values associated with a plurality of sensed current values of the incandescent light source, wherein the current sense resistor provides a sensed operating current of the incandescent light source to the microprocessor, wherein, in response to the provided operating current of the incandescent light source, the microprocessor selects one of plurality of LED operating current values from the look-up table in view of the provided operating current of the incandescent light source.

23. The system for dimming one or more light sources according to claim 20, wherein the one or more components includes:

a microprocessor including a look-up table, wherein the look-up table includes a plurality of LED operating current values associated with a plurality of sensed luminescent values of the incandescent light source, wherein the optical sensor provides a sensed luminescent value of the incandescent light source to the microprocessor, wherein, in response to the provided luminescent value of the incandescent light source, the microprocessor selects one of plurality of LED operating current values from the look-up table in view of the provided luminescent value of the incandescent light source.

24. The system for dimming one or more light sources according to claim 20, wherein the light of the first brightness from the incandescent light source is not viewable by a vehicle occupant and wherein light of the second brightness from the LED is viewable by the vehicle occupant.

* * * * *